United States Patent [19]
Atsuchi

[11] Patent Number: 5,826,959
[45] Date of Patent: Oct. 27, 1998

[54] PROJECTION IMAGE DISPLAY APPARATUS

[75] Inventor: Naruhiko Atsuchi, Nakakoma-gun, Japan

[73] Assignee: Pioneer Electronic Corporation, Tokyo, Japan

[21] Appl. No.: 852,379

[22] Filed: May 7, 1997

[30] Foreign Application Priority Data

May 9, 1996 [JP] Japan .................................. 8-139534

[51] Int. Cl.⁶ .................................................. G03B 21/28
[52] U.S. Cl. ............................ 353/20; 353/31; 353/33; 353/34; 359/9
[58] Field of Search ............................... 353/20, 31, 33, 353/34, 37; 349/5, 7, 8, 9, 57

[56] References Cited

U.S. PATENT DOCUMENTS

| | | | |
|---|---|---|---|
| 5,365,287 | 11/1994 | Vollmer et al. | 353/20 |
| 5,374,968 | 12/1994 | Haven et al. | 353/31 |
| 5,575,548 | 11/1996 | Lee | 353/34 |
| 5,653,520 | 8/1997 | Kato | 353/20 |
| 5,658,060 | 8/1997 | Dove | 353/20 |

*Primary Examiner*—William Dowling
*Attorney, Agent, or Firm*—Sughrue, Mion, Zinn, Macpeak & Seas, PLLC

[57] ABSTRACT

An object of the present invention is to provide a simple image projection apparatus which prevents color shading. First, second and third dichroic mirrors are provided in parallel which separate light from a source into red, blue, and green components. First and second polarization beam splitters are provided with operative surfaces perpendicular to the dichroic mirrors for reflecting predetermined polarization light components of two colors to two reflection type liquid crystal devices. A third polarization beam splitter having an operative surface in parallel to the dichroic mirrors is provided for reflecting a predetermined polarized light component of the third color component to a third reflection type liquid crystal device. A cross dichroic prism device is provided for combining the modulated light from the three liquid crystal devices and transmitting the synthesized light for projection.

13 Claims, 10 Drawing Sheets

PROJECTION IMAGE DISPLAY APPARATUS

BACKGROUND OF THE INVENTION

1. Field of the Invention

The present invention relates to a projection image display apparatus using a reflection liquid crystal device.

2. Description of the Related Arts

One conventional projection image display apparatus using a reflection liquid crystal device is disclosed in Japanese Patent Publication No. Hei 5-82793. The optical system of this projection image display apparatus is illustrated in FIG. 1.

In this figure, reference numerals "50R", "50G" and "50B" are reflection liquid crystal (LC) devices which rotate planes of polarization pixel by pixel based on red, green and blue signals, respectively. A polarization beam splitter 51, a blue reflecting dichroic mirror 52, and a red reflecting dichroic mirror 53 are arranged in this order. The LC device 50G is located on the rectilinear propagation side of the red reflecting dichroic mirror 53 with the LC device 50R located on the reflection side thereof.

The LC device 50B is located on the reflection side of the blue reflecting dichroic mirror 52. Numeral "54" is a xenon lamp 54, a constituent of a light source, numeral "55" is an elliptic mirror, numeral "56" is a parallel concave lens and numeral "57" is a projection lens.

The light from the xenon lamp 54 is converted by the lens 56 to parallel light beam, which are in turn supplied to the polarization beam splitter 51. The splitter 51 splits the parallel light to P-polarized light which propagates rectilinearly and S-polarized light which is reflected. The S-polarized light travels through the blue reflecting dichroic mirror 52 and the red reflecting dichroic mirror 53 to be separated to red, green and blue lights which respectively reach the LC devices 50R, 50G and 50B. When the red light enters the LC device 50R, polarized light with the polarization plane rotated for each pixel electrode in accordance with the red image signal is acquired as reflected light, which is supplied back to the polarization beam splitter 51. In this case, only the P-polarized light which is produced by the rotation of the polarization plane propagates straight to the projection lens 57. The same is true of the green and blue lights incident to the LC devices 50G and 50B. The polarization beam splitter 51 synthesizes the received red light, green light and blue light, so that a color image is projected on the screen (not shown) via the projection lens 57.

To improve the brightness, a metal halide lamp may be used in place of the xenon lamp as the light source in the above-discussed optical system. This metal halide lamp has spectra as shown in FIG. 2; the blue (B) spectrum exists near 440 nm, the green (G) spectrum near 550 nm and the red (R) spectrum in the range from 600 nm to 700 nm. Note that "N" denotes an orange spectrum, actually unnecessary spectrum component, located near 580 nm in the vicinity of the green (G) spectrum.

To separate and synthesize the red light, green light and blue light, the characteristic of the red reflecting dichroic mirror and the characteristic of the blue reflecting dichroic mirror are set as illustrated in FIGS. 3 and 4, respectively. In those figures, hatched portions are the spectra that are to be reflected.

Generally, the light from the light source is converted to a parallel beam before reaching the dichroic mirrors. However, it is difficult to convert the light to a perfect parallel beam, and the side portions of the parallel beam do not become parallel to the center light thereof. While the light reflection characteristics of the individual dichroic mirrors are set on the condition that the incident light on each dichroic mirror meets at an angle of 45° a normal line at point of incidence on the reflective surface of the dichroic mirror, the side light components ("s" and "u" in FIG. 5 which exemplifies the case of the red reflecting dichroic mirror 53) actually meet a normal line at point of incidence on the dichroic mirror at angles of 45°+α and 45°−α (α being about 8°) which differ from the expected angle of 45° and from each other.

Specifically, the actual characteristic of the red reflecting dichroic mirror shows dependency on the incident angle, and appears as "W" in FIG. 3 with respect to the center light "t" but as "V" and "X", shifted from "W", with respect to the side light components s and u.

Therefore, the unnecessary spectrum N is completely reflected at the red reflecting dichroic mirror for the side light component s, while the spectrum N completely passes this dichroic mirror for the side light component u. As a result, the hues of one side light component s and the other light component u, both incident to the LC device 50R, significantly differ from each other, thus causing so-called color shading, that is, a significant difference in hue between the right and left portions or the upper and lower portions of the final image projected on the screen.

The same phenomenon occurs in the case of the blue reflecting dichroic mirror, and the reflection characteristics of the side light components incident to this dichroic mirror, which correspond to "s" and "u", become as shown by the broken line and the dot and dash line in FIG. 4.

OBJECT AND SUMMARY OF THE INVENTION

Accordingly, it is a primary objective of the present invention to provide a projection image display apparatus using reflection LC devices, which can prevent color shading with a simple structure requiring no additional optical system.

To achieve this object, a projection image display apparatus according to this invention comprises: a light source for generating at least three light components of blue, green and red; a first dichroic mirror for receiving the light coming from the light source, transmitting the blue light component and reflecting the green and red light components; a second dichroic mirror, oriented substantially in parallel with the first dichroic mirror, for receiving the green and red light components reflected at the first dichroic mirror and for reflecting the green light component and transmitting the red light component; a third dichroic mirror, oriented substantially in parallel with the first dichroic mirror, for receiving the blue light components having transmitted through the first dichroic mirror, and for reflecting the blue light component; a first polarization beam splitter having an operative surface substantially perpendicular to the second dichroic mirror, for reflecting a predetermined polarized light component of the red light component having transmitted through the second dichroic mirror; a red reflection liquid crystal device for receiving light coming from the first polarization beam splitter and reflecting polarized light with a plane of polarization rotated in accordance with an image signal corresponding to a red color; a second polarization beam splitter having an operative surface substantially perpendicular to the second dichroic mirror, for reflecting a predetermined polarized light component of the green light component reflected at the second dichroic mirror; a green reflection liquid crystal device for receiving light coming from the second polarization beam splitter and reflecting polarized light with a plane of polarization rotated in accordance with an image signal corresponding to a green color; a third polarization beam splitter having an operating surface substantially parallel to the third dichroic mirror, for reflecting a predetermined polarized light component of the blue light component reflected at the third dichroic mirror; a blue reflection liquid crystal device for receiving light coming from the third polarization beam splitter and reflecting polarized light with a plane of polarization rotated in accordance with an image signal corresponding to a blue color; a cross prism including a fourth dichroic mirror, oriented substantially perpendicularly to the operative surfaces of the first and second polarization beam splitters and substantially in parallel with the operative surface of the third polarization beam splitter, for reflecting the red light component and transmitting the green and blue light components, and a fifth dichroic mirror, so oriented as to cross the fourth dichroic mirror, for reflecting the blue light component and transmitting the green and red light components, the cross prism synthesizing the red, green and blue light components emitted from the red, green and blue reflection liquid crystal devices and having passed through the first, second and third polarization beam splitters and emitting resultant synthesized light; and a projection optical system for receiving the synthesized light from the cross prism.

In this projection image display apparatus, at least one of the second and fourth dichroic mirrors may be comprised of a multi-layer film having at least two layers of different optical refractive indices stacked one on after (or in a predetermined order) in such a manner that the optical refractive index of one layer is approximately 2.50 while the optical refractive index of the other layer is 1.65 to 1.75.

On the other hand, in the display apparatus, at least one of the second and fourth dichroic mirrors may be comprised of a multi-layer film having at least two layers of different optical refractive indices stacked one on after (or in a predetermined order) in such a manner that the optical refractive index of one layer is approximately 2.35 while the optical refractive index of the other layer is about 1.70.

The second dichroic mirror may be comprised of a multi-layer film having at least two layers of a different optical refractive indices stacked in a predetermined order, and the thickness of the multi-layer film may be changed over the operating surface thereof.

A thickness of the multi-layer film may be changed over the operating surface thereof in accordance with incident angles of light coming from the first dichroic mirror.

Further, a metal halide lamp may be used for the light source.

Another projection image display apparatus according to the present invention comprises: a light source for generating at least three light components of blue, green and red; a first dichroic mirror for receiving the light coming from the light source, transmitting the red light component and reflecting the green and blue light components; a second dichroic mirror, oriented substantially in parallel with the first dichroic mirror, for receiving the green and blue light components reflected at the first dichroic mirror and for reflecting the green light component and transmitting the blue light component; a third dichroic mirror, oriented substantially in parallel with the first dichroic mirror, for receiving the red light components having transmitted through the first dichroic mirror, and for reflecting the red light component; a first polarization beam splitter having an operative surface substantially perpendicular to the second dichroic mirror, for reflecting a predetermined polarized light component of the blue light component having transmitted through the second dichroic mirror; a blue reflection liquid crystal device for receiving light coming from the first polarization beam splitter and reflecting polarized light with a plane of polarization rotated in accordance with an image signal corresponding to a blue color; a second polarization beam splitter having an operative surface substantially perpendicular to the second dichroic mirror, for reflecting a predetermined polarized light component of the green light component reflected at the second dichroic mirror; a green reflection liquid crystal device for receiving light coming from the second polarization beam splitter and reflecting polarized light with a plane of polarization rotated in accordance with an image signal corresponding to a green color; a third polarization beam splitter having an operating surface substantially parallel to the third dichroic mirror, for reflecting a predetermined polarized light component of the red light component reflected at the third dichroic mirror; a red reflection liquid crystal device for receiving light coming from the third polarization beam splitter and reflecting polarized light with a plane of polarization rotated in accordance with an image signal corresponding to a red color; a cross prism including a fourth dichroic mirror, oriented substantially perpendicularly to the operative surfaces of the first and second polarization beam splitters and substantially in parallel with the operative surface of the third polarization beam splitter, for reflecting the blue light component and transmitting the green and red light components, and a fifth dichroic mirror, so oriented as to cross the fourth dichroic mirror, for reflecting the red light component and transmitting the green and blue light components, the cross prism synthesizing the red, green and blue light components emitted from the red, green and blue reflection liquid crystal devices and having passed through the first, second and third polarization beam splitters and emitting resultant synthesized light; and a projection optical system for receiving the synthesized light from the cross prism, wherein the fifth dichroic mirror is comprised of a multi-layer film having a plurality of layers of different optical refractive indices stacked in a predetermined order, a difference between a refractive index of one layer of the multi-layer film and a refractive index of the other layer of the multi-layer film being smaller than 0.90.

A refractive index of one layer of the multi-layer film may be substantially 2.50, and a refractive index of the other layer of the multi-layer film may be substantially between 1.65 and 1.75.

A refractive index of one layer of the multi-layer film may be substantially 2.35, and a refractive index of the other layer of the multi-layer film may be substantially 1.70.

Further projection image display apparatus according to the present invention comprises: a light source for generating at least three light components of blue, green and red; a first dichroic mirror for receiving the light coming from the light source, transmitting the red light component and reflecting the green and blue light components; a second dichroic mirror, oriented substantially in parallel with the first dichroic mirror, for receiving the green and blue light components reflected at the first dichroic mirror and for reflecting the green light component and transmitting the blue light component; a third dichroic mirror, oriented substantially in parallel with the first dichroic mirror, for receiving the red light components having transmitted through the first dichroic mirror, and for reflecting the red light component; a first polarization beam splitter having an operative surface substantially perpendicular to the second dichroic mirror, for reflecting a predetermined polarized light component of the blue light component having transmitted through the second dichroic mirror; a blue reflection liquid crystal device for receiving light coming from the first polarization beam splitter and reflecting polarized light with a plane of polarization rotated in accordance with an image signal corresponding to a blue color; a second polarization beam splitter having an operative surface substantially perpendicular to the second dichroic mirror, for reflecting a predetermined polarized light component of the green light component reflected at the second dichroic mirror; a green reflection liquid crystal device for receiving light coming from the second polarization beam splitter and reflecting polarized light with a plane of polarization rotated in accordance with an image signal corresponding to a green color; a third polarization beam splitter having an operating surface substantially parallel to the third dichroic mirror, for reflecting a predetermined polarized light component of the red light component reflected at the third dichroic mirror; a red reflection liquid crystal device for receiving light coming from the third polarization beam splitter and reflecting polarized light with a plane of polarization rotated in accordance with an image signal corresponding to a red color; a cross prism including a fourth dichroic mirror, oriented substantially perpendicularly to the operative surfaces of the first and second polarization beam splitters and substantially in parallel with the operative surface of the third polarization beam splitter, for reflecting the blue light component and transmitting the green and red light components, and a fifth dichroic mirror, so oriented as to cross the fourth dichroic mirror, for reflecting the red light component and transmitting the green and blue light components, the cross prism synthesizing the red, green and blue light components emitted from the red, green and blue reflection liquid crystal devices and having passed through the first, second and third polarization beam splitters and emitting resultant synthesized light; and a projection optical system for receiving the synthesized light from the cross prism, wherein the first dichroic mirror is comprised of a multi-layer film having at least two layers stacked in a predetermined order, a thickness of the multi-layer film is changed over on operative surface thereof.

A thickness of the multi-layer film is changed over on operative surface thereof in accordance with an incident angles of the light coming from the light source.

According to the above respective aspects, the projection image display apparatus using the reflection liquid crystal device can shift the boundary between the reflection band and transmission band of red and green lights, outside the band of the unnecessary component (e.g., orange light) in accordance with the incident angle to thereby narrow the shade band.

DETAILED DESCRIPTION OF THE PREFERRED EMBODIMENT

Figure 6:
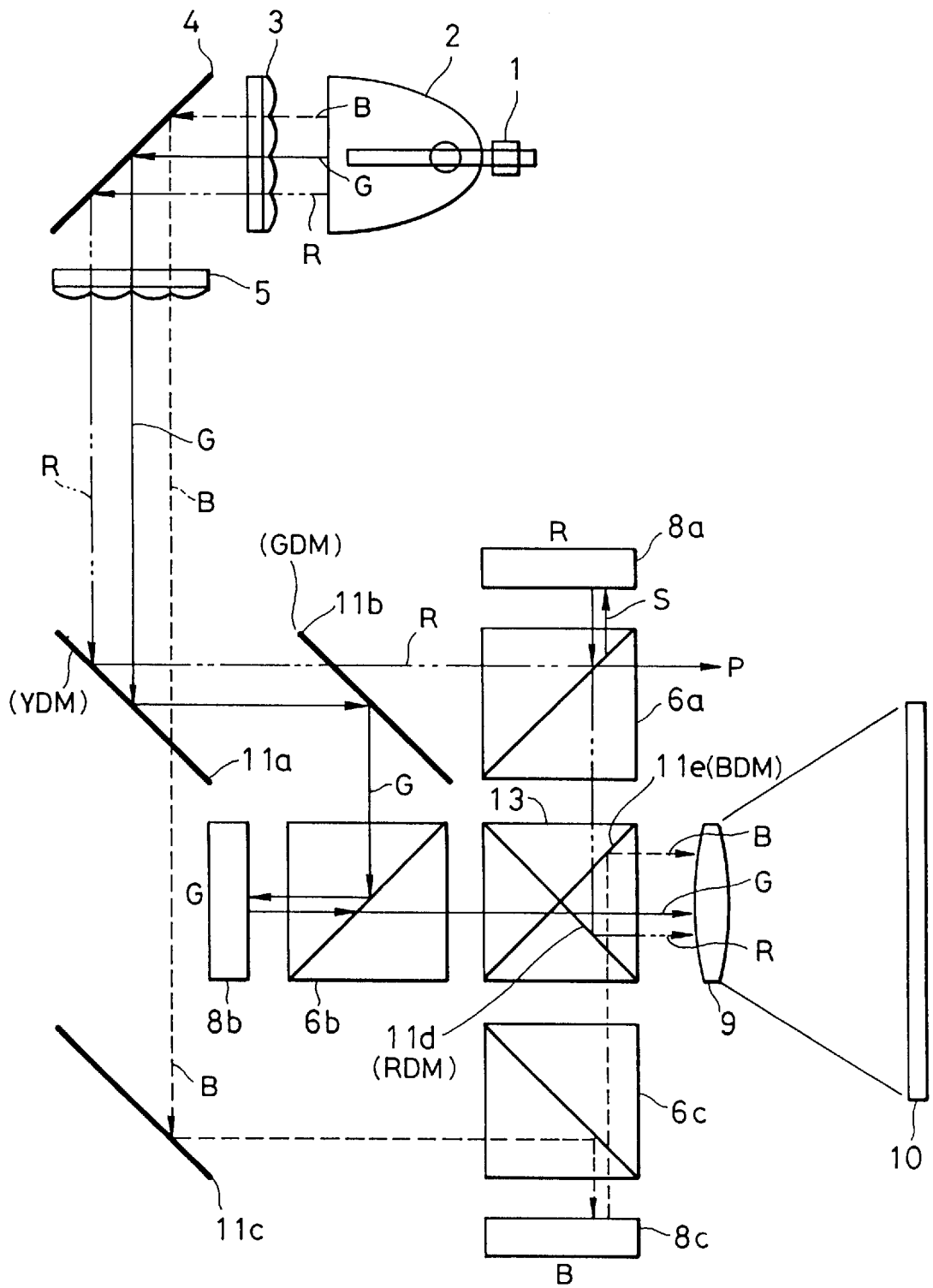
FIG. 6 is a schematic diagram illustrating the structure of a projection image display apparatus according to one embodiment of the present invention.

FIG. 6 illustrates a projection image display apparatus according to one embodiment of this invention. In this figure, red light is indicated by the two dot and one dash line, green light by the solid line and blue light by the broken line.

Figure 1:
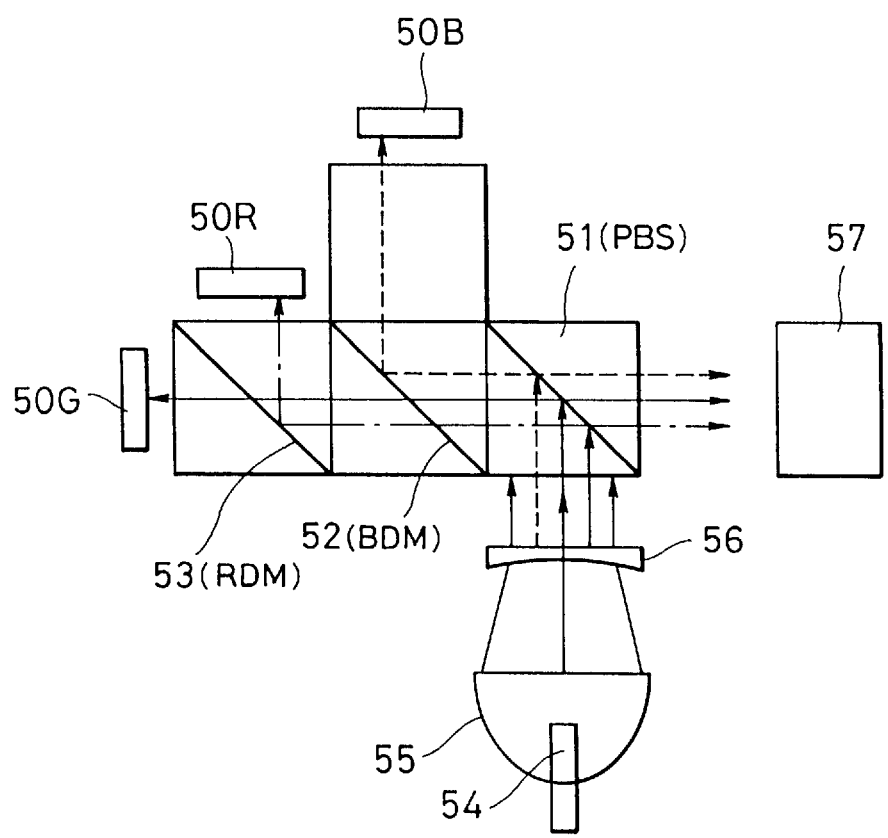
FIG. 1 is a schematic diagram illustrating the structure of the optical system of a conventional projection image display apparatus using reflection LC devices.
Figure 2:
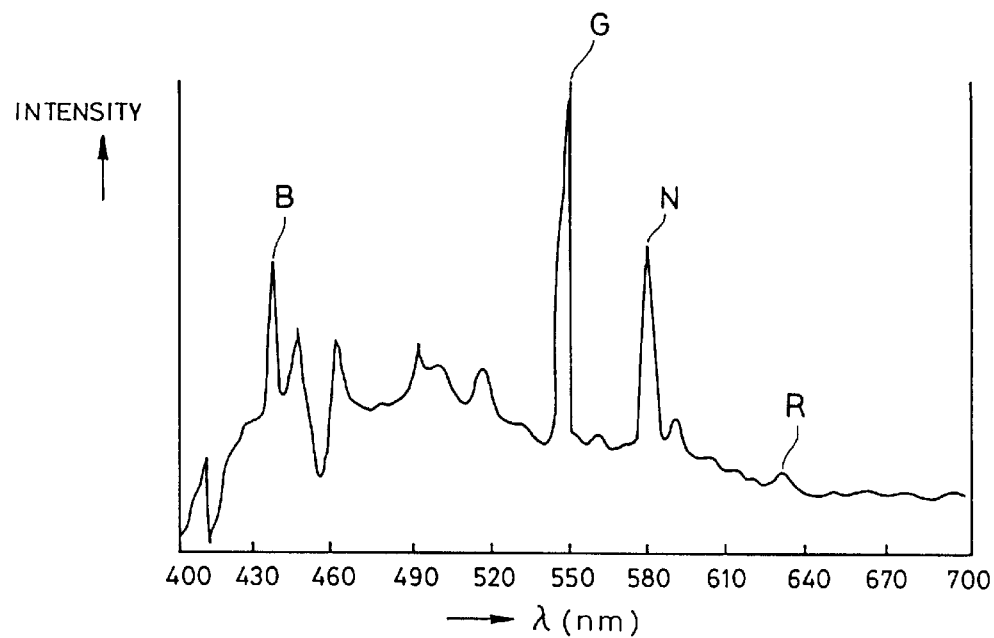
FIG. 2 is a characteristic diagram showing the spectra of a metal halide lamp.
Figure 3:
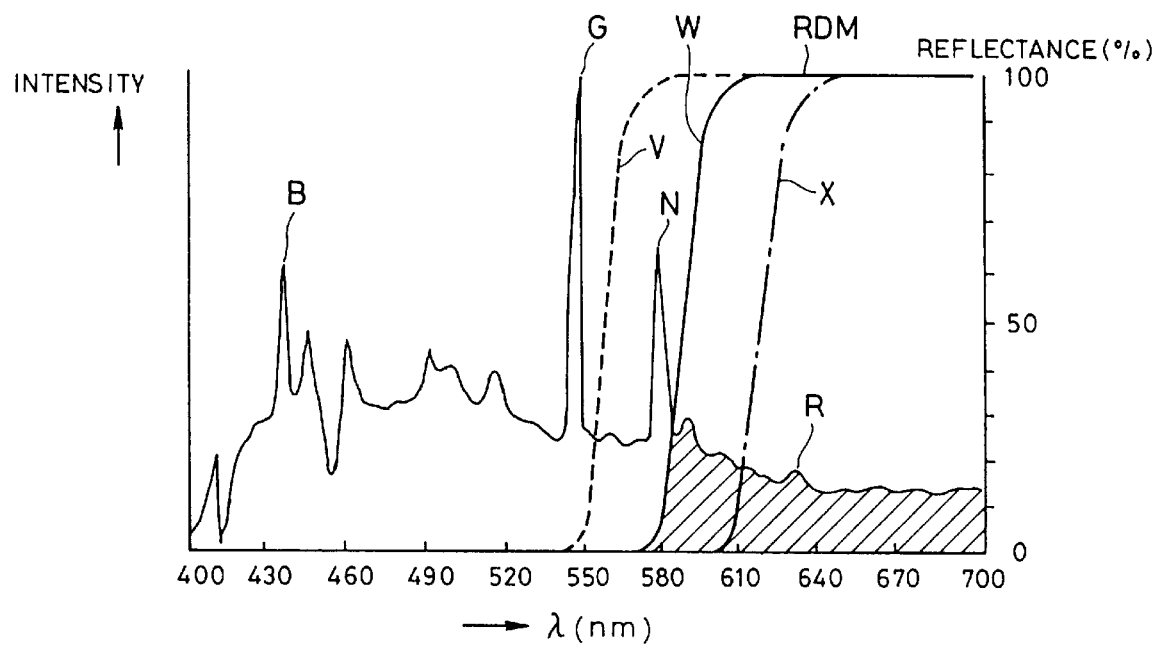
FIG. 3 is a diagram showing the characteristic of a conventional red reflecting dichroic mirror.
Figure 4:
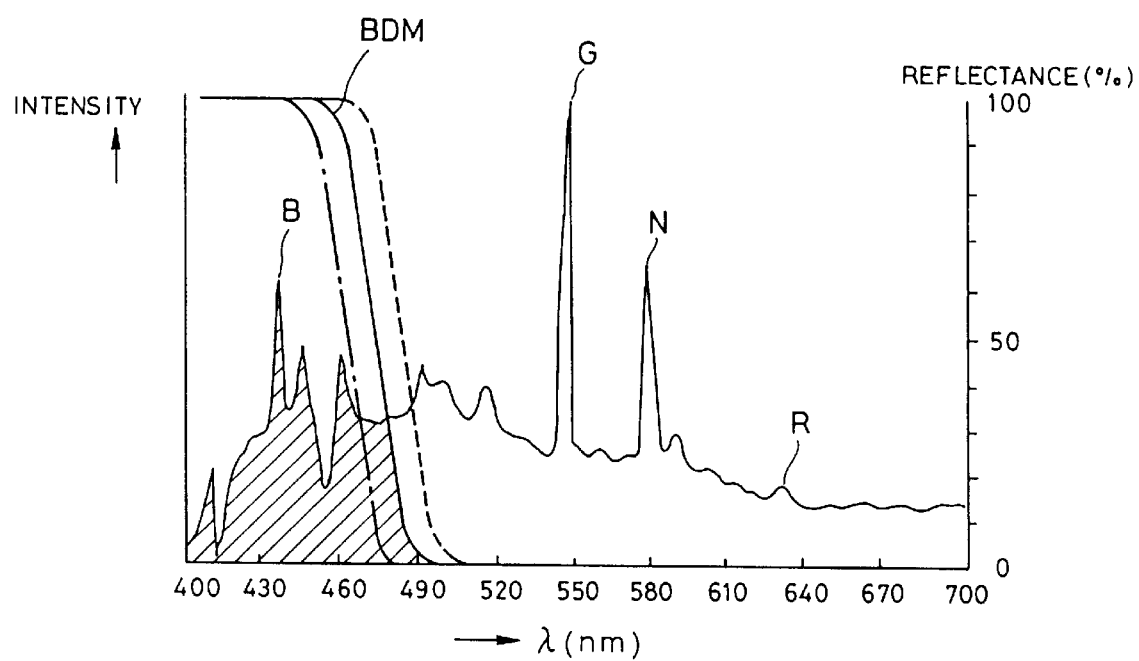
FIG. 4 is a diagram showing the characteristic of a conventional blue reflecting dichroic mirror.

A light source 1 is a metal halide lamp, or a pencil or point type white light source, which irradiates light containing light components of three primary colors of red (R), green (G) and blue (B), and has spectra as illustrated in FIG. 2. The light emitted from the light source 1 is reflected at a reflector (elliptic mirror) 2 and issues from it as approximately parallel beam. The beam is transmitted through a first integrator 3, which is a lens plate having a plurality of spherical lenses arranged in a matrix form, and is reflected at a reflection mirror 4. The beam then is transmitted through a second integrator 5 to enter a yellow reflecting dichroic mirror (YDM) 11a.

The yellow reflecting dichroic mirror 11a transmits blue light and reflects green light and red light. The red light reflected by this dichroic mirror 11a passes a green reflection dichroic mirror (GDM) 11b, located or oriented substantially in parallel with the dichroic mirror 11a, and reaches a polarization beam splitter 6a whose operative surface is substantially perpendicular to the dichroic mirror 11b. The green light reflected at the yellow reflecting dichroic mirror 11a is reflected at the dichroic mirror 11b, and reaches a polarization beam splitter 6b whose operative surface is substantially perpendicular to the dichroic mirror 11b. The blue light, which has passed the yellow reflecting dichroic mirror 11a, is reflected at a blue reflecting dichroic mirror (BDM) 11c, located substantially in parallel with the dichroic mirror 11a and the reflected light reaches a polarization beam splitter 6c whose operative surface is substantially in parallel with the dichroic mirror 11c.

Each of the red, green and blue lights is separated to an S-polarized light component, which is reflected at the associated one of the operative surfaces of the polarization beam splitters 6a, 6b and 6c, and a P-polarized light component, which passes the same operative surface of the associated polarization beam splitter. The individual S-polarized light components respectively reach red, green and blue reflection LC devices 8a, 8b and 8c. Upon reception of the individual color lights, each of the reflection LC devices 8a to 8c rotates a plane of polarization of the associated incident color light for each pixel electrode in accordance with an image signal corresponding to the associated primary color, and reflects the polarized light. This reflected lights travel the incident light paths back to the polarization beam splitters 6a, 6b and 6c in the opposite directions from the individual reflection LC devices. In this case, only the P-polarized light components produced by the rotation of the planes of polarization pass through the operative surfaces of the polarization beam splitters 6a–6c and reach a synthesizing cross prism 13.

This synthesizing cross prism 13 is comprised of four triple prisms whose cross sections are right angled isosceles triangles. Two surfaces of each triple prisms, which are at right angles to each other, are adhered to two surfaces of other two triple prisms, which are also at right angles to each other, so that those four triple prisms appear as a square pole. Dichroic mirrors are provided at the adhered surfaces. More specifically, there are: a red reflecting dichroic mirror (RDM) 11d, which is substantially perpendicular to the operative surfaces of the polarization beam splitters 6a and 6b and is substantially parallel to the operative surface of the polarization beam splitter 6c; and a blue reflecting dichroic mirror (BDM) 11e, which crosses this red reflecting dichroic mirror 11d and is substantially parallel to the operative surfaces of the polarization beam splitters 6a and 6b and substantially perpendicular to the operative surface of the polarization beam splitter 6c.

The red light from the reflection LC device 8a, which has passed the operative surface of the polarization beam splitter 6a, is reflected at the red reflective dichroic mirror 11d. The green light from the reflection LC device 8b, which has passed the operative surface of the polarization beam splitter 6b, passes the red reflecting dichroic mirror 11d and the blue reflecting dichroic mirror 11e. The blue light from the reflection LC device 8c, which has passed the operative surface of the polarization beam splitter 6c, is reflected at the blue reflection dichroic mirror 11e. Accordingly, three primary color lights according to image signals are synthesized and the resultant light enters a projection lens 9. The synthesized light is projected in a magnified form on a screen 10.

Figure 7:
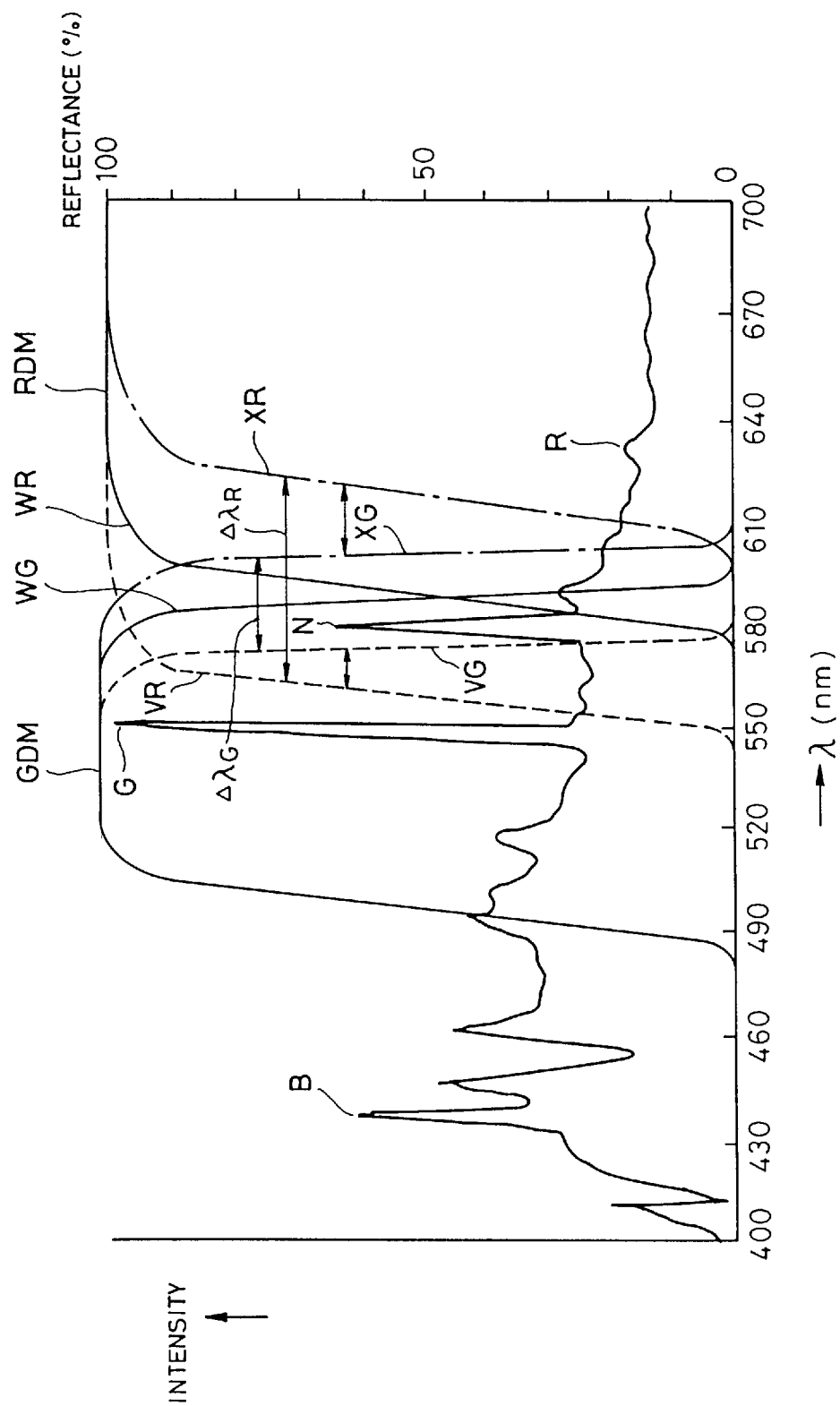
FIG. 7 is a diagram showing the characteristic of a constituent of an optical system adapted to the display apparatus of this embodiment.

The principle of reducing color shading by means of the above-discussed optical system will now be explained with reference to FIGS. 7 through 9. FIG. 7 shows the spectra of the metal halide lamp and the characteristics of the green reflection dichroic mirror 11b and the red reflection dichroic mirror 11d in the synthesizing cross prism 13. As mentioned earlier, due to the dependency on the incident angle, while the characteristic of the green reflection dichroic mirror 11b is "WG" in FIG. 7 with respect to the center light "t", it becomes "VG" with respect to the side light "s" incident at an angle of 45°+α (see FIG. 5) and becomes "XG" with respect to the side light "u" incident at an angle of 45°−α (see FIG. 5). While the characteristic of the red reflection dichroic mirror 11d is "WR" in FIG. 7 with respect to the center light "t", it becomes "VR" with respect to the side light "s" incident at an angle of 45°+α and becomes "XR" with respect to the side light "u" incident at an angle of 45°−α. Therefore, the reflection-transmission band boundary (or the transmission-reflection band boundary) of each side light is shifted by approximately ±10 to 30 nm.

Figure 8:
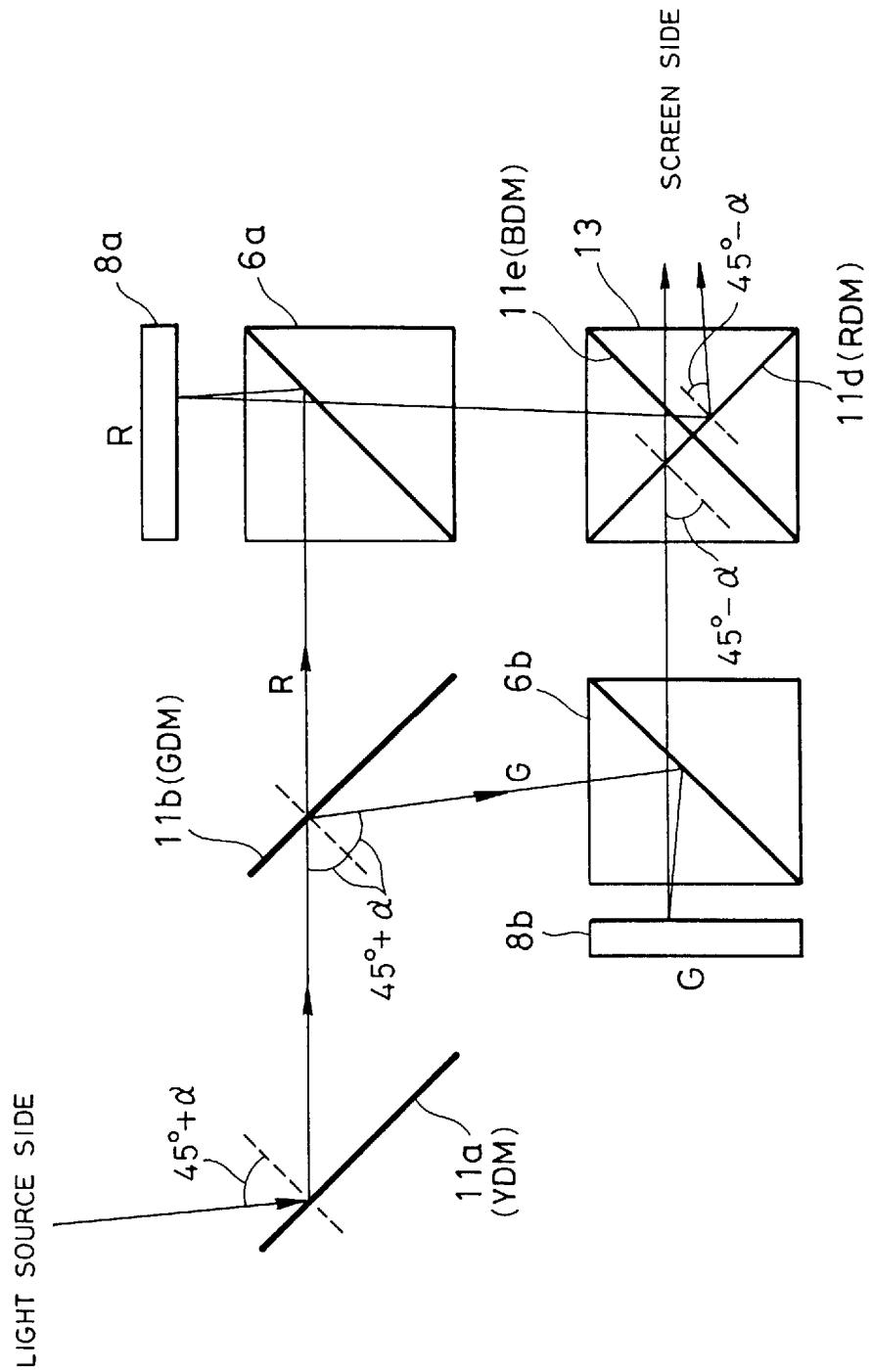
FIG. 8 is a schematic exemplary diagram showing a light path along which one side light component travels in the optical system adapted to the display apparatus of this embodiment.

As shown in FIG. 8, however, the green light component and red light component of the side light "s" incident to the yellow reflection dichroic mirror 11a at an angle of 45°+α are reflected and hit the green reflection dichroic mirror 11b at an angle of 45°+α. In this case, the boundary of the transmission band of the red light which passes this dichroic mirror 11b becomes as indicated by "VG" in FIG. 7, so that the red light component which has a longer wavelength than that boundary passes the green reflection dichroic mirror 11b. The red light having passed the green reflection dichroic mirror 11b is reflected at the operative surface of the polarization beam splitter 6a, then enters the reflection LC device 8a to be modulated. The resultant light passes the polarization beam splitter 6a again to hit the red reflection dichroic mirror 11d of the synthesizing cross prism 13. As the operating surface of the polarization beam splitter 6a and the red reflection dichroic mirror 11d of the synthesizing cross prism 13 are set substantially perpendicular to each other, the incident angle of the red light incident to the red reflection dichroic mirror 11d becomes 45°−α. This means that the side light "u" has entered the dichroic mirror 11d. Therefore, the boundary of the reflection band of the red light which is reflected at the red reflection dichroic mirror 11d becomes as indicated by "XR" in FIG. 7, so that the red light component which has a longer wavelength than that boundary is reflected.

Figure 9:
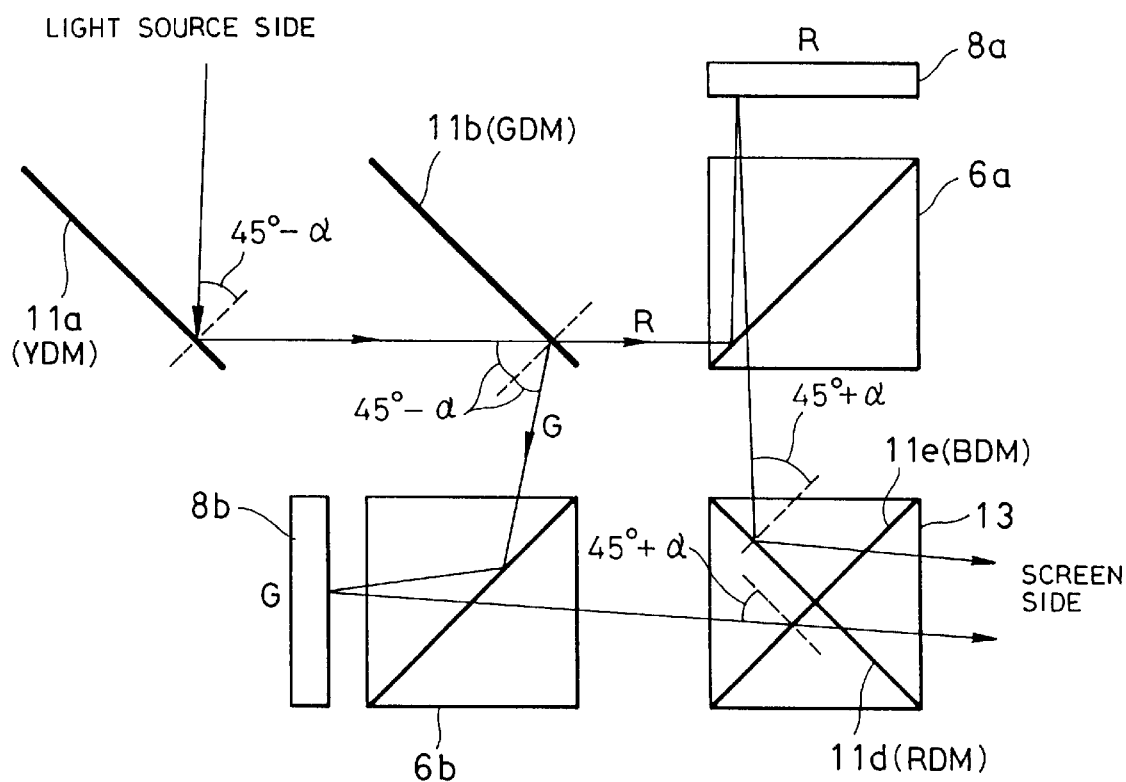
FIG. 9 is a schematic exemplary diagram showing a light path along which the other side light component travels in the optical system adapted to the display apparatus of this embodiment.

As shown in FIG. 9, the green light component and red light component of the side light "u" incident to the yellow reflection dichroic mirror 11a at an angle of 45°−α are reflected and hit the green reflection dichroic mirror 11b at an angle of 45°−α. In this case, the boundary of the transmission band of the red light which passes the green reflection dichroic mirror 11b becomes as indicated by "XG" in FIG. 7, so that the red light component which has a longer wavelength than that boundary passes this dichroic mirror 11b. The red light having passed the green reflection dichroic mirror 11b is reflected at the operative surface of the polarization beam splitter 6a, then enters the reflection LC device 8a to be modulated. The resultant light passes the polarization beam splitter 6a again to hit the red reflection dichroic mirror 11d of the synthesizing cross prism 13. As the operative surface of the polarization beam splitter 6a and the red reflection dichroic mirror 11d of the synthesizing cross prism 13 are set substantially perpendicular to each other, the incident angle of the red light incident to the red reflection dichroic mirror 11d becomes 45°+α. This means that the side light "s" has entered the dichroic mirror 11d. Therefore, the boundary of the reflection band of the red light which is reflected at the red reflection dichroic mirror 11d becomes as indicated by "VR" in FIG. 7. Since the red light component which has a longer wavelength than the boundary indicated by "XG" hits the dichroic mirror 11d, however, the actual boundary of the reflection band of the red light becomes as indicated by "XG" and the red light component which has a longer wavelength than "XG" travels to the projection lens 9.

As apparent from the above, the boundary between the reflection band and the transmission band of the red light, which is shifted according to the incident angle, ranges between "XG" and "XR", thus narrowing the shade band. This can suppress the occurrence of shading due to the spectrum N of orange light.

Likewise, the range of the boundary between the reflection band and the transmission band of the green light, which is shifted according to the incident angle, is reduced.

As shown in FIG. 8, the green light component and red light component of the side light "s" incident to the yellow reflection dichroic mirror 11a at an angle of 45°+α are reflected and hit the green reflection dichroic mirror 11b at an angle of 45°+α. In this case, the boundary of the reflection band of the green light which is reflected at this dichroic mirror 11b becomes as indicated by "VG" in FIG. 7, so that the green light component which has a shorter wavelength than that boundary is reflected at the dichroic mirror 11b. The green light reflected at the green reflection dichroic mirror 11b is reflected at the operative surface of the polarization beam splitter 6b, then enters the reflection LC device 8b to be modulated. The resultant light passes the polarization beam splitter 6b again to hit the red reflection dichroic mirror 11d of the synthesizing cross prism 13. As the operative surface of the polarization beam splitter 6b and the red reflection dichroic mirror 11d of the synthesizing cross prism 13 are set substantially perpendicular to each other, the incident angle of the green light incident to the red reflection dichroic mirror 11d becomes 45°–α. This means that the side light "u" has entered the dichroic mirror 11d. Therefore, the boundary of the transmission band of the green light which passes the red reflection dichroic mirror 11d becomes as indicated by "XR" in FIG. 7. Since only the green light component which has a shorter wavelength than the boundary indicated by "VG" actually hits the dichroic mirror 11d, however, the boundary of the transmission band of the green light becomes as indicated by "VG".

As shown in FIG. 9, the green light component and red light component of the side light "u" incident to the yellow reflection dichroic mirror 11a at an angle of 45°–α are reflected and hit the green reflection dichroic mirror 11b at an angle of 45°–α. In this case, the boundary of the reflection band of the green light which is reflected at the green reflection dichroic mirror 11b becomes as indicated by "XG" in FIG. 7, so that the green light component having a shorter wavelength than that boundary is reflected at this dichroic mirror 11b. The green light having passed the green reflection dichroic mirror 11b is reflected at the operative surface of the polarization beam splitter 6b, then enters the reflection LC device 8b to be modulated. The resultant light passes the polarization beam splitter 6b again to hit the red reflection dichroic mirror 11d of the synthesizing cross prism 13. As the operative surface of the polarization beam splitter 6a and the red reflection dichroic mirror 11d of the synthesizing cross prism 13 are set substantially perpendicular to each other, the incident angle of the green light incident to the red reflection dichroic mirror 11d becomes 45°+α. This means that the side light "s" has entered the dichroic mirror 11d. Therefore, the boundary of the transmission band of the green light which passes the red reflection dichroic mirror 11d becomes as indicated by "VR" in FIG. 7, and the green light having a shorter wavelength than the boundary passes the dichroic mirror 11d.

As apparent from the above, the boundary between the reflection band and the transmission band of the green light, which is shifted according to the incident angle, ranges between "VR" and "VG", thus narrowing the shade band. This can suppress the occurrence of shading due to the spectrum N of orange light.

Although the shade bands of the green reflection dichroic mirror and the red reflection dichroic mirror are narrowed by arranging the optical system in a specific way or location in this embodiment, the same advantages may be obtained by modifying the structure of predetermined at least one of the dichroic mirrors.

More specifically, although each of the green reflection dichroic mirror 11b and the red reflection dichroic mirror 11d is comprised of a multi-layer film which has two or more layers of different refractive indices stacked one on another (or in a predetermined order), the refractive index of one layer of at least one of the dichroic mirrors, e.g., the red reflection dichroic mirror 11d, may be set to approximately 2.50 and the refractive index of the other layer of the same mirror may be set to a range between 1.65 and 1.75. The one layer may be made from e.g., TiO$_2$, and the other layer may be made from by e.g., a mixed film.

The reason why the refractive indices of the respective layers should be set in such a manner as mentioned above will now be described.

Assuming that a refractive index of one layer is "n1", a refractive index of the other layer is "n2", and a reference wavelength of incident light on a dichroic mirror (in the present embodiment, a designated wavelength corresponding to red, green or blue light) is "λ0", the following formula can be substantially derived for the dichroic mirror having the layers and being supplied with an incident light beam with the reference wavelength:

$$\Delta\lambda/\lambda 0 = (4/\pi)\cdot\sin^{-1}\{(n1-n2)/(n1+n2)\}$$

where, Δλ equates a width of wavelengths of boundaries between transmission and reflection bands, being subject variations depending on incident angles of the incident light beam, that is, a shade band's width.

Based on the above formula, the refractive index for the incident light beam having the reference wavelength λ0 increases in accordance with increase in the ratio n1/n2, whereby Δλ becomes greater. Hence, the shade band's width Δλ, corresponding to Δλ$_R$ and Δλ$_G$ in FIG. 7, can be minimized by minimizing the value of n1/n2, namely by minimizing the difference between the refractive index n1 of one layer and the refractive index n2 of the other layer.

The inventor of the present application has made the one layer to have a refractive index of approximately 2.35 and the other layer to have a refractive index of approximately 1.45 and the difference between those indices is 0.9. Preferably, as previously mentioned above, the inventor has made the one layer to have a refractive index of about 2.35 and the other layer to have that of 1.65 to 1.75 respectively and the difference between indices is 0.85 to 0.75. Thus, the dichroic mirror made of these layers according to the subject invention has a small difference between refractive indices. As a consequence, it was revealed through the inventor's experiments that such arrangements mentioned above can contribute to significantly narrow the shade band. It was further revealed by the inventor that a dichroic mirror may be acquired with a remarkably narrow shade-band by using the one layer of TiO$_2$ having the refractive index of 2.35 and another layer of SiO$_2$ having the refractive index of 1.70 as the particular one and other layers.

A dichroic mirror made of multiple layers having a small difference between refractive indices can be used for any dichroic mirror used in an optical system in the arrangement shown in FIG. 6, and such dichroic mirror is most desirable for the red reflecting dichroic mirror 11d.

The shade band can be narrowed also if the film thickness of the green reflection dichroic mirror 11b in the optical system arranged as illustrated in FIG. 6 gradually changes over the film surface in such a way that the film thickness on the side of the mirror where an incident light of the beam impinges at an angle of 45°+α becomes greater than the film thickness on the side of the mirror where an incident light of the beam impinges at an angle of 45°–α.

Figure 10:
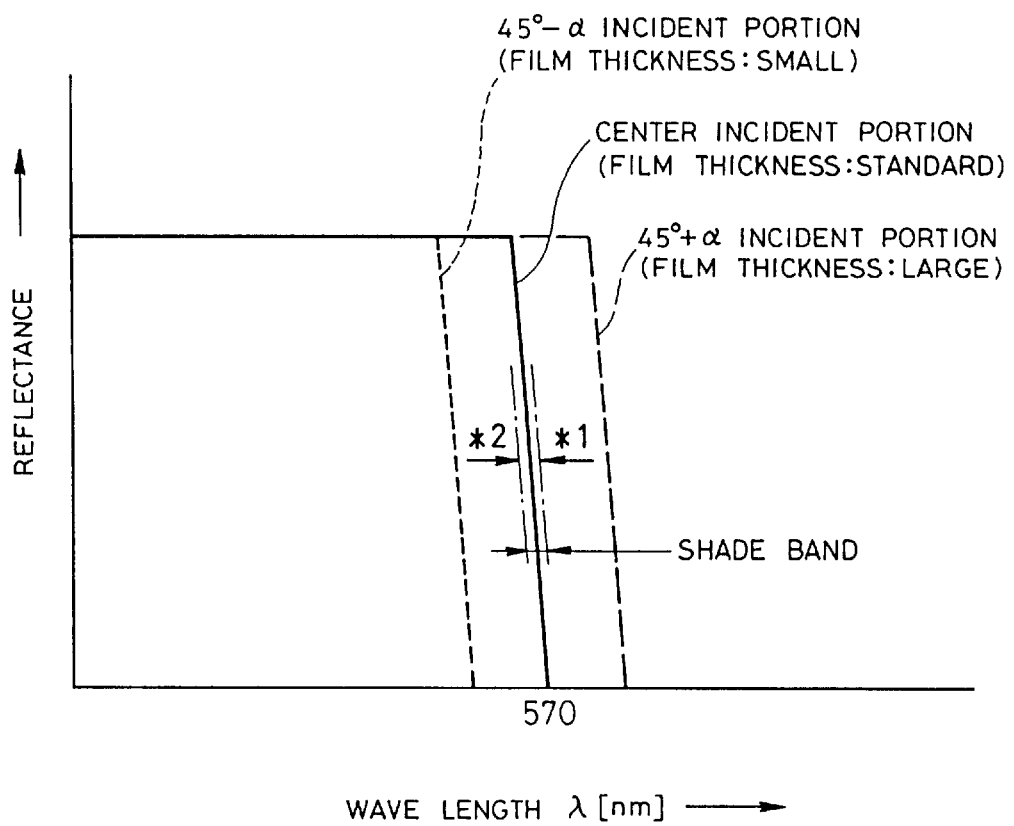
FIG. 10 is a diagram showing a example of setting the optical reflectance characteristic of a dichroic mirror adapted to the display apparatus of first and second embodiments according to the present invention.

More specifically in regard to the above point, while it has been already described that a dichroic mirror makes its boundary of reflection/transmission band shift to the side of shorter wavelength as an incident angle thereat becomes larger, the dichroic mirror, on the other hand, has a nature in which that boundary shifts to the side of longer wavelength with thickening a film forming an operative surface of the dichroic mirror even if the incident angle is the same. FIG. 10 shows an example of setting the optical reflectance characteristic of a green reflecting dichroic mirror utilizing such a relationship.

Figure 5:
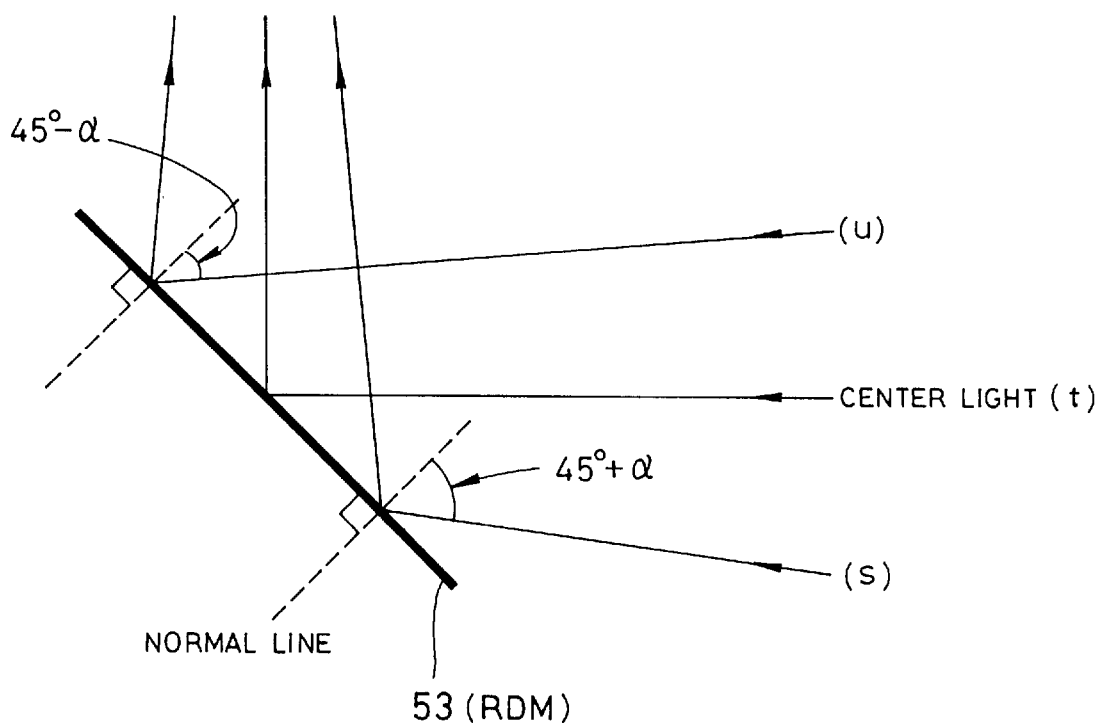
FIG. 5 is an exemplary diagram illustrating how the center light and side light components are incident to a dichroic mirror.

The center of the beam at an incident angle of 45° enters a center portion in an operative surface of the green reflecting dichroic mirror (See FIG. 5). Thus the center portion is formed in standard or reference thickness of film such that predetermined green light is appropriately reflected at the center portion, to thereby be set to a standard reflectance characteristic as illustrated by a solid line in FIG. 10. On the other hand, one side portion in an operative surface, to which the edge portion of the light beam at an incident angle of 45°+$\alpha$ is entered, of the green reflecting dichroic mirror is formed in larger thickness of film than the above standard thickness (e.g., +15 nm), whereby the one side portion is set to a reflectance characteristic in which a boundary between reflection and transmission bands is shifted to the side of longer wavelength as illustrated by a long dashed line in FIG. 10. Besides, another side portion in an operative surface, to which the edge portion of the light beam at an incident angle of 45°−$\alpha$ is entered, of the green reflecting dichroic mirror is formed in smaller thickness of film than the above standard thickness (e.g., −15 nm), whereby the another side portion is set to a reflectance characteristic in which a boundary between reflection and transmission bands is shifted to the side of shorter wavelength as illustrated by a short dashed line in FIG. 10.

As light at an incident angle of 45°+$\alpha$ enters the dichroic mirror set as mentioned above, it will make the boundary between reflection and transmission bands to shift to the side of shorter wavelength because that the light itself has a relatively large incident angle. At the same time, that boundary has been already shifted to the side of longer wavelength as shown in the figure by relatively large thickness of film at point of incidence regarding to the light. Such two shifting effects, therefore, will suicide one another or absorb each other, and consequently, the boundary finally obtained becomes close to a boundary on the standard reflectance characteristic. (*1)

Similarly, as light at an incident angle of 45°−$\alpha$ enters the dichroic mirror, it will make the boundary between reflection and transmission bands shift to the side of longer wavelength because that the light itself has a relatively small incident angle. At the same time, that boundary has been already shifted to the side of shorter wavelength as shown in the figure by relatively small thickness of film at point of incidence regarding to the light. Such two shifting effects, therefore, will suicide one another or absorb each other, and consequently, the boundary finally obtained becomes close to a boundary on the standard reflectance characteristic. (*2)

Hence, narrowing or reducing a shade band in a dichroic mirror can be achieved in such a way that a film thickness of a portion in an operative surface thereof to which the light enters at a larger incident angle is set to be larger and a film thickness of a portion in an operative surface of the mirror to which the light enters at a smaller incident angle is set to be smaller.

The reduction of a shade band width based on a thickness of film may be preferably accomplished in the green reflecting dichroic mirror 11$b$. Moreover, together with the reduction of a shade band width based on a thickness of film, the reduction of a shade band width based on a difference between refractive indices of layered films, as mentioned above, may be applied to the red reflecting dichroic mirror 11$d$.

Figure 11:
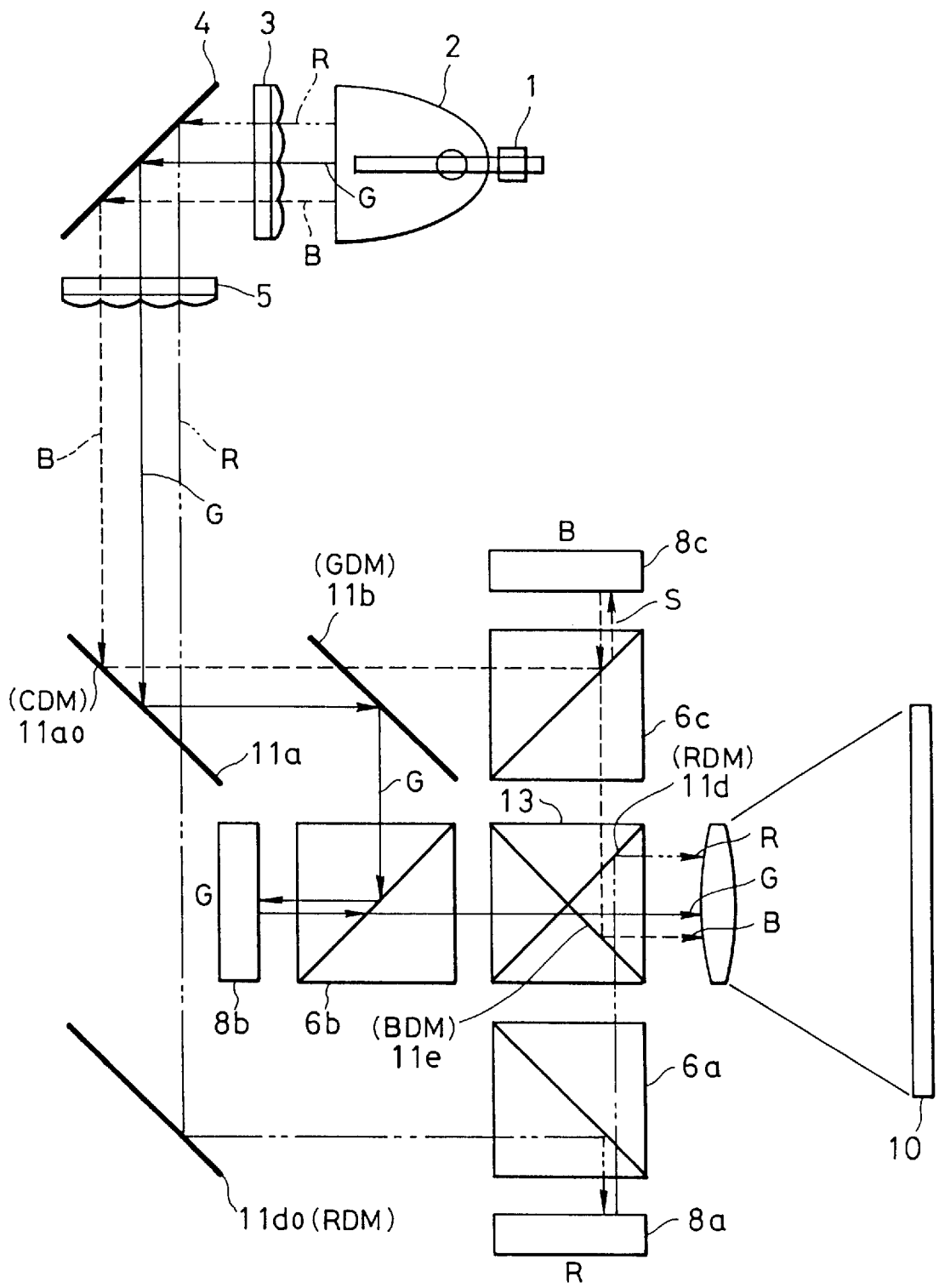
FIG. 11 is a schematic diagram illustrating the structure of a projection image display apparatus of second embodiment according to the present invention.

In the meantime, the reductions of a shade band width based on structure of a dichroic mirror as described above is not restricted to the optical system of structure shown in FIG. 6, which can be also applied to the optical system of structure as shown in FIG. 11.

Referring to FIG. 11, this system provides a cyan reflecting dichroic mirror (CDM) 11$a_0$ for reflecting green and blue light and transmitting red light, instead of the yellow dichroic mirror 11$a$. Correspondingly, a red reflecting dichroic mirror 11$d_0$ is used for reflecting red light having been transmitted through the cyan reflecting dichroic mirror 11$a_0$, instead of the blue reflecting dichroic mirror 11$c$, and the red reflection type LC device 8$a$ and the blue reflection type LC device 8$c$ are interchanged while the corresponding polarization beam splitter 6$a$ and 6$c$ are suitably located and oriented. The synthesizing cross prism 13 is changed so as to have new orientation which is rotated from orientation of FIG. 6 by 90° i.e., in which the blue reflecting dichroic mirror 11$e$ and the red reflecting dichroic mirror 11$d$ are changed to each other.

The red reflection LC device 8$a$ is supplied with red light which has been transmitted through the cyan reflecting dichroic mirror 11$a_0$, then reflected at the red reflecting dichroic mirror 11$d_0$ and passed through the polarization beam splitter 6$a$. The blue reflection LC device 8$c$ is supplied with green light which has been reflected at the cyan reflecting dichroic mirror 11$a_0$, then transmitted through the green reflecting dichroic mirror 11$b$ and passed through the polarization beam splitter 6$c$. The other arrangement and optical path are substantially the same as those of FIG. 6.

Such a structure of optical system does not function to narrow a shade band width based on the location or orientation of respective optical devices, but it is enable to narrow a shade band width by any designated dichroic mirror. Preferably, the cyan reflecting dichroic mirror 11$a_0$ may perform the reduction of a shade band width based on the thickness of film, together with which or independently of which the red reflecting dichroic mirror 11$d$ may perform the reduction of a shade band width based on formation of multi-layered films having a small difference between refractive indices. It, however, does not preclude that the other dichroic mirror may perform those shade-band reductions.

The emphasis in the above description may seem to be on setting of a dichroic mirror so as to just narrowing a shade band width, but a dichroic mirror can be set so as to narrow a shade band width together with eliminating unnecessary light components e.g., an orange light component (N), namely, in order for a shade band not to include the unnecessary light components.

The projection image display apparatus using reflection LC devices, as described above, can prevent color shading with a simple structure without requiring any additional optical member.

What is claimed is:

1. A projection image display apparatus comprising:
   a light source for generating at least three light components of blue, green and red;
   a first dichroic mirror for receiving the light coming from said light source, transmitting said blue light component and reflecting said green and red light components;
   a second dichroic mirror, oriented substantially in parallel with said first dichroic mirror, for receiving said green and red light components reflected at said first dichroic mirror and for reflecting said green light component and transmitting said red light component;

a third dichroic mirror, oriented substantially in parallel with said first dichroic mirror, for receiving said blue light components having transmitted through said first dichroic mirror, and for reflecting said blue light component;

a first polarization beam splitter having an operative surface substantially perpendicular to said second dichroic mirror, for reflecting a predetermined polarized light component of said red light component having transmitted through said second dichroic mirror;

a red reflection liquid crystal device for receiving light coming from said first polarization beam splitter and reflecting polarized light with a plane of polarization rotated in accordance with an image signal corresponding to a red color;

a second polarization beam splitter having an operative surface substantially perpendicular to said second dichroic mirror, for reflecting a predetermined polarized light component of said green light component reflected at said second dichroic mirror;

a green reflection liquid crystal device for receiving light coming from said second polarization beam splitter and reflecting polarized light with a plane of polarization rotated in accordance with an image signal corresponding to a green color;

a third polarization beam splitter having an operating surface substantially parallel to said third dichroic mirror, for reflecting a predetermined polarized light component of said blue light component reflected at said third dichroic mirror;

a blue reflection liquid crystal device for receiving light coming from said third polarization beam splitter and reflecting polarized light with a plane of polarization rotated in accordance with an image signal corresponding to a blue color;

a cross prism including a fourth dichroic mirror, oriented substantially perpendicularly to said operative surfaces of said first and second polarization beam splitters and substantially in parallel with said operative surface of said third polarization beam splitter, for reflecting said red light component and transmitting said green and blue light components, and a fifth dichroic mirror, so oriented as to cross said fourth dichroic mirror, for reflecting said blue light component and transmitting said green and red light components, said cross prism synthesizing said red, green and blue light components emitted from said red, green and blue reflection liquid crystal devices and having passed through said first, second and third polarization beam splitters and emitting resultant synthesized light; and a projection optical system for receiving said synthesized light from said cross prism.

2. The projection image display apparatus according to claim 1, wherein at least one of said second and fourth dichroic mirrors is comprised of a multi-layer film having a plurality of layers of different optical refractive indices stacked in a predetermined order, said multi-layer film including a film having an optical refractive index of approximately 2.5 and a film having an optical refractive index of 1.65 to 1.75.

3. The projection image display apparatus according to claim 2, wherein at least one of said second and fourth dichroic mirrors is comprised of a multi-layer film having at least two layers of different optical refractive indices stacked one on another, said optical refractive index of one layer being approximately 2.50 while said optical refractive index of the other layer is 1.65 to 1.75.

4. The projection image display apparatus according to claim 1, wherein at least one of said second and fourth dichroic mirrors is comprised of a multi-layer film having a plurality of layers of different optical refractive indices stacked in a predetermined order, said multi-layer film including a film having an optical refractive index of approximately 2.35 and a film having an optical refractive index of approximately 1.70.

5. The projection image display apparatus according to claim 4, wherein at least one of said second and fourth dichroic mirrors is comprised of a multi-layer film having at least two layers of different optical refractive indices stacked one on another, said optical refractive index of one layer being approximately 2.35 while said optical refractive index of the other layer is approximately 1.70.

6. The projection image display apparatus according to claim 1, wherein said second dichroic mirror is comprised of a multi-layer film having at least two layers of different optical refractive indices stacked in a predetermined order, and a thickness of said multi-layer film is changed over on operative surface thereof.

7. The projection image display apparatus according to claim 6, wherein said thickness of said multi-layer film is changed over on operative surface thereof in accordance with incident angles of light coming from said first dichroic mirror.

8. The projection image display apparatus according to claim 1, wherein said light source is a metal halide lamp.

9. A projection image display apparatus comprising:

a light source for generating at least three light components of blue, green and red;

a first dichroic mirror for receiving the light coming from said light source, transmitting said red light component and reflecting said green and blue light components;

a second dichroic mirror, oriented substantially in parallel with said first dichroic mirror, for receiving said green and blue light components reflected at said first dichroic mirror and for reflecting said green light component and transmitting said blue light component;

a third dichroic mirror, oriented substantially in parallel with said first dichroic mirror, for receiving said red light components having transmitted through said first dichroic mirror, and for reflecting said red light component;

a first polarization beam splitter having an operative surface substantially perpendicular to said second dichroic mirror, for reflecting a predetermined polarized light component of said blue light component having transmitted through said second dichroic mirror;

a blue reflection liquid crystal device for receiving light coming from said first polarization beam splitter and reflecting polarized light with a plane of polarization rotated in accordance with an image signal corresponding to a blue color;

a second polarization beam splitter having an operative surface substantially perpendicular to said second dichroic mirror, for reflecting a predetermined polarized light component of said green light component reflected at said second dichroic mirror;

a green reflection liquid crystal device for receiving light coming from said second polarization beam splitter and reflecting polarized light with a plane of polarization rotated in accordance with an image signal corresponding to a green color;

a third polarization beam splitter having an operating surface substantially parallel to said third dichroic mirror, for reflecting a predetermined polarized light component of said red light component reflected at said third dichroic mirror;

a red reflection liquid crystal device for receiving light coming from said third polarization beam splitter and reflecting polarized light with a plane of polarization rotated in accordance with an image signal corresponding to a red color;

a cross prism including a fourth dichroic mirror, oriented substantially perpendicularly to said operative surfaces of said first and second polarization beam splitters and substantially in parallel with said operative surface of said third polarization beam splitter, for reflecting said blue light component and transmitting said green and red light components, and a fifth dichroic mirror, so oriented as to cross said fourth dichroic mirror, for reflecting said red light component and transmitting said green and blue light components, said cross prism synthesizing said red, green and blue light components emitted from said red, green and blue reflection liquid crystal devices and having passed through said first, second and third polarization beam splitters and emitting resultant synthesized light; and a projection optical system for receiving said synthesized light from said cross prism, wherein said fifth dichroic mirror is comprised of a multi-layer film having a plurality of layers of different optical refractive indices stacked in a predetermined order, a difference between a refractive index of one layer of said multi-layer film and a refractive index of the other layer of said multi-layer film being smaller than 0.90.

10. The projection image display apparatus according to claim 9, wherein a refractive index of one layer of said multi-layer film is substantially 2.50, and a refractive index of the other layer of said multi-layer film is substantially between 1.65 and 1.75.

11. The projection image display apparatus according to claim 9, wherein a refractive index of one layer of said multi-layer film is substantially 2.35, and a refractive index of the other layer of said multi-layer film is substantially 1.70.

12. A projection image display apparatus comprising:

a light source for generating at least three light components of blue, green and red;

a first dichroic mirror for receiving the light coming from said light source, transmitting said red light component and reflecting said green and blue light components;

a second dichroic mirror, oriented substantially in parallel with said first dichroic mirror, for receiving said green and blue light components reflected at said first dichroic mirror and for reflecting said green light component and transmitting said blue light component;

a third dichroic mirror, oriented substantially in parallel with said first dichroic mirror, for receiving said red light components having transmitted through said first dichroic mirror, and for reflecting said red light component;

a first polarization beam splitter having an operative surface substantially perpendicular to said second dichroic mirror, for reflecting a predetermined polarized light component of said blue light component having transmitted through said second dichroic mirror;

a blue reflection liquid crystal device for receiving light coming from said first polarization beam splitter and reflecting polarized light with a plane of polarization rotated in accordance with an image signal corresponding to a blue color;

a second polarization beam splitter having an operative surface substantially perpendicular to said second dichroic mirror, for reflecting a predetermined polarized light component of said green light component reflected at said second dichroic mirror;

a green reflection liquid crystal device for receiving light coming from said second polarization beam splitter and reflecting polarized light with a plane of polarization rotated in accordance with an image signal corresponding to a green color;

a third polarization beam splitter having an operating surface substantially parallel to said third dichroic mirror, for reflecting a predetermined polarized light component of said red light component reflected at said third dichroic mirror;

a red reflection liquid crystal device for receiving light coming from said third polarization beam splitter and reflecting polarized light with a plane of polarization rotated in accordance with an image signal corresponding to a red color;

a cross prism including a fourth dichroic mirror, oriented substantially perpendicularly to said operative surfaces of said first and second polarization beam splitters and substantially in parallel with said operative surface of said third polarization beam splitter, for reflecting said blue light component and transmitting said green and red light components, and a fifth dichroic mirror, so oriented as to cross said fourth dichroic mirror, for reflecting said red light component and transmitting said green and blue light components, said cross prism synthesizing said red, green and blue light components emitted from said red, green and blue reflection liquid crystal devices and having passed through said first, second and third polarization beam splitters and emitting resultant synthesized light; and a projection optical system for receiving said synthesized light from said cross prism, wherein said first dichroic mirror is comprised of a multi-layer film having at least two layers stacked in a predetermined order, a thickness of said multi-layer film is changed over on operative surface thereof.

13. The projection image display apparatus according to claim 12, wherein a thickness of said multi-layer film is changed over on operative surface thereof in accordance with an incident angles of the light coming from said light source.

* * * * *